Patented Nov. 2, 1937

2,097,766

UNITED STATES PATENT OFFICE 2,097,766

MEANS FOR PRODUCING MUSHROOMS

Herman Knaust and Henry Knaust,
West Camp, N. Y.

No Drawing. Original application August 2, 1934, Serial No. 738,118. Divided and this application March 12, 1936, Serial No. 68,450

4 Claims. (Cl. 47—37)

This invention relates to apparatus useful in connection with the production of mushrooms, and to an intermediate product produced as a result of certain steps in a process of producing mushrooms and useful in connection therewith.

The principal objects of the invention are to produce mushrooms more efficiently than heretofore, to provide apparatus and an intermediate product which enable this object to be attained with especial reference to large scale production, to facilitate the control of disease and to provide means for controlling the spread of parasitic and disease organisms among mushrooms growing in large scale production, to permit inspection of the root structure for contamination before it is mingled under the same roof with other growing mushrooms, and to provide means whereby inexperienced persons may grow mushrooms in quantity production under conditions where control of temperature, light and disease is less rigid than has heretofore been considered necessary.

This application is a division of our co-pending application, Serial No. 738,118, filed by us August 2, 1934. Attention is called to our Patent 2,034,678.

The conditions under which mushrooms have heretofore been grown commercially are described in Circular No. 251 of the United States Department of Agriculture published December 1932, entitled "Mushroom Growing in the United States". According to the process there described the manure, after suitable sterilization, is placed on long shelves in the mushroom growing houses, is inoculated with spawn, and a suitable period of time is permitted in which the root structure, or mycelium, forms within the body of the manure. When the mycelium has formed to a sufficient extent so that the bed of manure is saturated with a tangled mass of white threadlike roots, the beds are cased with a layer of soil, moistened, and thereupon mushrooms begin to form above the upper surface of the soil. Upon the exhaustion of the beds, the exhausted manure and roots are shoveled out, newly prepared manure is placed in position and inoculated with spawn and the process is repeated.

It has also been proposed, though not commercially practised, to carry the manure into the mushroom growing houses in small frames enclosed with wire screening, letting the mycelium form within the frame as it rests on suitable supports in the mushroom growing houses, and then letting mushrooms develop through the screens on the top, sides, bottom and ends of the frame without disturbing the position of the frame in the mushroom growing houses.

One of the most serious problems presented in the growing of mushrooms by these prior processes has arisen by reason of the sensitiveness of the manure-bed, during the period that the root structure or mycelium is forming, to the growth of parasitic or disease organisms.

During the period that the root structure is forming a certain amount of moisture must be maintained in the fertilizer bed, as is well understood, and the temperature must be maintained in the neighborhood of 70° F. Under these conditions the mycelium will form in a tangled mass of white threads throughout the bed of the manure in the space of about three weeks. These conditions of humidity and temperature are, however, also well suited to the growth of parasitic organisms and disease fungi which, if not checked or controlled, destroy the intended crop of mushrooms. Accordingly it is common practise to sterilize the bed of manure before inoculating it with spawn, by subjecting it to a temperature of about 130° F. for from 12 to 24 hours. In this way, unless the bed is afterwards contaminated in some way, the organisms of a parasitic or disease nature are retarded sufficiently to enable the mycelium to get well started in its healthy growth when the bed has been inoculated with mushroom spawn. Unfortunately, however, it is not possible to prevent entirely the contamination of the growing beds during the three weeks' time that the mycelium is forming, as many of the disease spores are present in the air and may be carried into the mushroom growing houses through the ventilation system, or otherwise.

In consequence, the most vulnerable point in mushroom growing, so far as concerns parasitic or disease growths, is the period of approximately three weeks in which the mycelium is forming. The same likelihood of disease or parasitic growth forming in the manure bed is not present in the later stages of mushroom growing. Once the manure is thoroughly impregnated with mycelium, it becomes resistant to the development of many kinds of parasitic or disease growths, apparently because the mycelium tends to crowd out other forms of growths.

Thus, when it has heretofore been the practise to develop the root structure or mycelium in manure lying on a number of long shelves in a mushroom growing house, and thereafter without disturbing the manure beds to produce mushrooms in the same place, the disadvantage has been observed that if a disease or parasitic growth establishes itself in some part of one of the beds during the initial stage of mycelium formation it is most difficult to deal with. It may spread and destroy the yield of mushrooms throughout the entire shelf or bed and in some cases may spread to other nearby beds. If the affected portion of the bed is attempted to be removed or shoveled out the disease spores may be spread through the air to affect the entire mushroom house. Furthermore, a mushroom growing house, when used both for the initial stage of mycelium formation and for the later stage of mushroom production, must necessarily be handled and operated by a person skilled in conducting both stages, whereas relatively less skill is required in the later stage of producing and picking mushrooms and relatively less special equipment for control of temperature, humidity and light is needed for this later stage.

A further objection to the method heretofore used for growing mushrooms has been that the layer of soil, known as casing, which must be applied on top of the manure bed before mushroom growing begins, cannot be efficiently applied in the exact thickness best suited to mushroom growing when men in the mushroom houses attempt to spread it on a number of relatively closely-spaced shelves, some near the floor, some near the roof. The attempt to handle the casing soil under cramped working conditions results in uneven application thereof—thicker in some places and thinner in others—with resulting unevenness in the yield of mushrooms from a bed otherwise containing a healthy and well-developed mycelium formation.

Another difficulty with the method heretofore used has lain in the necessity for handling large quantities of manure and casing soil into and out of the mushroom growing house in restricted space where handling is slow and relatively inefficient. The manure and soil are usually moved in small trucks or cars, and inside the house must be shoveled by hand in small quantities, the men working in narrow aisles and inserting it between closely spaced shelves, some close to the floor, others high up near the roof. Under such conditions, handling is slow and labor costs are relatively high.

The present invention takes advantage of the difference in vulnerability of the manure bed, before and after development of the mycelium structure, to propose means and apparatus whereby the manure bed is subject to the most rigid control as to conditions of sanitation, sterility, moisture and temperature during the period that the mycelium or root structure is forming, and at the same time facilitates the production of the mushrooms themselves from predeveloped root structure under conditions where relatively little skill is called for as regards control of parasitic or disease organisms on the part of the mushroom grower.

Accordingly, the present invention proposes that the manure beds, in which the mycelium is to be developed, shall be formed in relatively small containers of convenient size for handling, shipping and sterilizing, and that the manure bed containers shall be impregnated with root structure at a central factory or plant under skilled control of moisture, temperature and sanitary conditions, that the transportable containers, when the mycelium or root structure is fully formed therein, shall then be subject to proper inspection, sorting and casing, and that such transportable container may then be sold or shipped in a relatively dry condition, not favorable for immediate development of mushrooms, to growers and other persons generally who need not be equipped with special skill or specially designed mushroom growing houses but who can grow mushrooms therefrom anywhere, either in daylight or in the dark, provided only that the material within the container is moistened and the container is maintained at a temperature between 45° and 70° F.

The following description of the invention is set forth by way of illustration only—

Fresh manure is piled to a depth of about four feet on the concrete floor of a curing room sufficiently large to hold about 250 tons. Means are provided to permit circulation of air under the manure, the preferable means for this purpose being wooden horses of triangular shape with open slatting on the sides which are set end to end in rows across the floor about four feet apart. These horses are from two and a half to three feet high and permit circulation of air under the manure. The manure is kept in this manner in the curing room from three to five weeks, being turned by hand two to four times during this interval. During this period the manure ferments and its temperature rises, a temperature of as high as 180° F. being common in the interior of the pile. Care must be taken, by turning or forking over the manure, to prevent "burning." When the manure reaches the stage in which it is most suited for mushroom growth, it is nearly odorless and there is relatively little remaining heat of fermentation. The bed of manure can be maintained for three or four days in this condition suitable for the succeeding steps of the process.

Preferably six curing rooms are maintained for the fermenting of the manure, using these in rotation so that cured manure is ready in substantial quantities each day and the entire operation can be carried on continuously.

The manure is next shoveled into portable containers (previously sterilized as described hereafter) which may conveniently be made of California redwood or cedar. A container of a convenient size for handling may be three or more feet in length, two or more feet in width, and not over five inches in depth. Such a container will hold approximately 100 pounds of manure when it is filled to a depth of about 4½ inches. In the illustration here given, it is contemplated that from one to three thousand such containers shall be filled per day. To facilitate the handling of so many containers we employ a conveyor system which can be extended into the curing room in which the cured manure lies, and the boxes are filled directly by shovel and placed upon the conveyor for transportation to the growing room which, preferably though not necessarily, is under the same roof as the rooms for the curing of the manure.

The containers filled with manure are then transported by conveyor into what will be called a growing room which is of sufficient size to permit the stacking, in staggered relation, of for example, from 500 to 3000 containers. In stacking the containers we place them in such manner that the atmosphere of the growing room may have free access to the manure in the container. To accomplish this the containers are not piled in vertical alinement with one another, but in staggered relation so that the end of a container in a lower row underlies the end of a container in the row immediately above, but the two containers extend in opposite directions, generally in the manner in which tiles and bricks are stacked in kilns, and as shown for example in the Walker Patent 266,562 patented October 24, 1882.

The growing room has one or more doors through which the containers may be charged to it, and preferably of sufficient size to permit introduction of the conveyor system to facilitate movement of the containers into the growing room. The growing room is equipped with heating and cooling means, and suitable thermostatic arrangements for the control thereof, so that the temperature may be adjusted and maintained at any desired level within the ranges required.

When the growing room has been fully charged with containers, as described, the conveyor is withdrawn, the doors closed and the room is brought to a temperature of approximately 130° F. and maintained at that temperature for about 24 hours. This temperature is sufficient to so far retard the subsequent growth of organisms of a parasitic or disease nature as to enable the mycelium to get well started on its healthy growth.

The temperature of the growing room is then lowered to approximately 70° F. and men then enter the growing room and inoculate the containers, without otherwise disturbing them, with a suitable amount of mushroom spawn. The method of stacking, already described, facilitates access to the containers for this purpose. We find that no particular care is needed as to spacing the lumps of spawn, or inserting the lumps beneath the surface of the manure. We find it sufficient to scatter a suitable amount of spawn upon the surface of the manure in each container by hand, which can be rapidly done. It will be understood that every effort is made at this stage to prevent the introduction of spores or germs of parasitic or disease organisms, and if such precautions are taken, ordinarily the containers will be free therefrom. If however, due to some carelesseness in handling, or the introduction of some spores or organism on the hands or clothing of the men, one or more of the containers becomes contaminated, the process is adapted to prevent the introduction of the diseased container into subsequent stages of mushroom growing.

After inoculation of the containers the doors of the growing room are closed and the growing room is left undisturbed for about two weeks, during which time it is maintained at a temperature as nearly 70° F. as possible. At the end of two weeks the temperature is lowered to 65° F. and there maintained during a third week. During the three weeks' period the mushroom spawn grows in the manure in the containers, and forms therein a tangled mass of fine white thread-like roots known as mycelium. This root structure does not, during this period, produce mushrooms, but the root structure thus formed becomes capable of mushroom production at later stages, as set forth below; and because it forms a dense tangle of roots within the manure makes the container highly resistant to the growth of any other organism and, therefore, relatively free from danger of subsequent contamination.

When the mycelium has fully formed in the containers the doors of the growing room are opened, the conveyor set in place, and the containers are moved out in succession along the conveyor for subsequent handling. In the continuous or cyclic method of producing these containers, here used by way of illustration, one or more growing rooms, each containing from 500 to 3000 containers, is discharged daily.

As the containers move out of the growing room on the conveyor they are first subject to inspection for evidence of disease or parasitic growth. It is one of the important features of the present invention to provide for such inspection where it may be efficiently made and before the container is cased with loam or soil. By such inspection it is possible to eliminate any container which shows signs of disease or parasitic growth, and it is also possible to observe and check accurately the growth of the mycelium by turning over a part of the contents of a container occasionally to make sure that the mycelium has fully penetrated the bed of manure therein. Thus the contents of the container can be standardized and controlled and the container itself, with its contents, can be sold and distributed as an ordinary article of merchandise and guaranteed to produce a certain poundage of mushroom free from disease when produced. Any containers revealed to be defective by the inspection are dumped and returned for sterilization.

After inspection, the containers are moved successively along the conveyor to pass under a hopper where they may be rapidly and uniformly cased with loam or other suitable soil. At this hopper a layer of casing is added to a uniform depth of about one-half inch on top of the mycelium-impregnated manure and approximately flush with the upper level of the container. The soil or loam used for casing is preferably sterilized in advance by subjecting it for 24 hours to a temperature from 160° to 180° F.

The containers are then ready for sale and transportation to mushroom growers. They may be handled by truck, boat, or otherwise.

These containers may be kept or stored with the root structure in a dormant condition practically indefinitely so long as the material in the container is kept dry and the temperature and humidity low. During this period they are highly resistant to the growth of other fungi or other parasitic or disease organisms, because the dense mycelium root structure within the manure tends to crowd out other organisms, if they should be introduced in some manner, and to prevent their growth. Even if the contents of the container should be accidentally dislodged, it can be restored without apparent injury to the subsequent mushroom crop.

In producing a crop of mushrooms from such a container, the mushroom grower need only sprinkle water on the surface of the casing loam, and place the container somewhere where it will have proper ventilation and will be maintained at a temperature between 45° and 70° F. It need not be kept in the dark, nor is there any need of keeping or handling it under sterile conditions. Accordingly a container prepared in the manner herein described is capable of producing mushrooms in the hands of relatively inexperienced persons, and in buildings, structures or caves not suited to the initial stage of mycelium formation.

When such container has been moistened, and placed where it has proper ventilation and is in an atmosphere whose temperature is between 45° and 70° F., it will begin to produce mushrooms somewhere between the fourteenth and sixteenth day. Thereafter it will continue in production for a period of about eight weeks, and in that time a container of the size herein described will produce from 15 to 20 pounds of mushrooms which may be picked in successive crops in the usual manner.

When the container will no longer produce, it is ready for return by the mushroom grower to the factory. In the case of large mushroom growers this can be done continuously, a small number of containers ready to produce mushrooms being delivered to him daily and a corresponding number of exhausted containers being returned by him daily to the factory.

The exhausted containers may then be returned to the factory where they may be first washed with water, and are then sterilized. To assure perfect sterilization we preferably subject these containers to an atmosphere of steam having a temperature of approximately 220° F. for a period of two hours.

The sterilized containers are then ready to be transported by the conveyor to the manure curing room to be recycled through the operation above described.

The use of containers as above described results in markedly improved control over parasitic and disease organisms, enables mushrooms to be produced continuously and at all seasons of the year, and enables inexperienced persons who have no equipment or knowledge for the control of sanitary conditions to produce mushrooms on a quantity basis for the market. Furthermore, it is possible for the mushroom grower to anticipate seasonal fluctuations in the market demand for mushrooms more accurately than is possible if he were pursuing the methods heretofore used, since he can regulate from day to day the number of containers he obtains from the factory.

While the specific embodiment of the process and apparatus set forth above for purposes of illustration is believed to give the best results, we intend and desire that the invention shall include all modifications and equivalents thereof which fall within the scope of the following claims.

Where, in the annexed claims, the expression "development-supporting material" is used, it is intended to refer either to manure or to any equivalent material which will support the growth of mycelium and the production of mushrooms.

We claim:

1. For use in the production of mushrooms, in combination, an open top transportable container having marginal walls of sufficient height to safely retain a mushroom growing bed therein during transportation and shipment of the container and of sufficient strength to permit stacking of large numbers of said containers in staggered and over-lapping relation in a growing zone, a bed of development-supporting material within said container impregnated with mycelium in dormant condition, and a layer of sterilized earthen material upon said bed.

2. For use in the production of mushrooms, in combination, a transportable container having marginal walls of sufficient height to safely retain a mushroom growing bed therein during transportation of the container and of sufficient strength to permit said container to be stacked with a plurality of other like containers one upon another in a growing zone, a bed of development-supporting material within said container impregnated with mycelium in dormant condition, and a layer of sterilized earthen material upon said bed.

3. For use in the production of mushrooms, in combination, a transportable container having marginal walls for retaining a mushroom growing bed therein and adapted to permit stacking said container with a plurality of other like containers one upon another, and a bed of development-supporting material within said container impregnated with mycelium in dormant condition, the contents of said container being capable of mushroom production upon moistening the same and placing the container with its contents in a zone suitable for the growth of mushrooms.

4. For use in the production of mushrooms, in combination, a transportable container of a depth small in relation to its length and width and adapted to be stacked with a plurality of other like containers so that the atmosphere has free access to the upper surface of the contents thereof, said container having marginal walls of sufficient height to safely retain a mushroom growing bed therein during transportation, a bed of development-supporting material within said container impregnated with mycelium in dormant condition, and a layer of sterilized earthen material upon said bed.

HERMAN KNAUST.
HENRY KNAUST.